United States Patent [19]

Friebe et al.

[11] Patent Number: 5,428,103
[45] Date of Patent: Jun. 27, 1995

[54] TITANIUM(IV) CHELATES AND THEIR USE IN POLYSILOXANE MATERIALS

[75] Inventors: Robert Friebe; John Huggins; Wilhelm Weber; Karl-Heinz Sockel, all of Leverkusen, Germany

[73] Assignee: Bayer Aktiengesellschaft, Leverkusen, Germany

[21] Appl. No.: 165,439

[22] Filed: Dec. 10, 1993

[30] Foreign Application Priority Data

Dec. 17, 1992 [DE] Germany .......... 42 42 622.7

[51] Int. Cl.$^6$ .............................. C08L 83/04
[52] U.S. Cl. .................... 524/731; 528/17; 524/267
[58] Field of Search .......... 528/17; 524/267, 731

[56] References Cited

U.S. PATENT DOCUMENTS

| | | |
|---|---|---|
| 3,334,067 | 8/1967 | Weyenberg . |
| 3,499,859 | 3/1970 | Matherly . |
| 4,438,039 | 3/1984 | Beers et al. . |
| 4,931,094 | 6/1990 | Barfurth et al. . |

FOREIGN PATENT DOCUMENTS 3512337 10/1986 Germany .

OTHER PUBLICATIONS

DIN 53,504, Mar. 1985, "Determination of tensile strength at break, tensile strength, elongation at break and stress values in a tensile test"; pp. 1–5; Germany.

*Primary Examiner*—Melvyn I. Marquis
*Attorney, Agent, or Firm*—Sprung Horn Kramer & Woods

[57] ABSTRACT

Reaction products of titanates with β-dicarbonyl compounds and citrates and their use in one-component RTV silicones.

3 Claims, No Drawings

TITANIUM(IV) CHELATES AND THEIR USE IN POLYSILOXANE MATERIALS

The present invention relates to titanium chelates, which contain both β-dicarbonyl compounds, such as e.g. ethyl acetoacetate, and citrates as chelating agents as well as preparations of these and their use in polysiloxane materials.

Polysiloxane materials according to the invention, which contain the novel titanium chelates, are characterised by little self-coloration and no or very little discoloration.

The polysiloxane materials according to the invention can be stored with the exclusion of moisture and are cured under the influence of water or water vapor or moisture at room temperature.

Such materials may be prepared from polydiorganosiloxanes with reactive terminal groups, silane cross-linkers and optional fillers, by using organotitanium compounds (U.S. Pat. No. 3,334,067, U.S. Pat. No. 3,499,859, U.S. Pat. No. 4,438,039). Such materials are hereinafter called on-component RTV materials.

The use of titanium compounds in 1K-RTV materials is restricted to specific classes of substances. If alkyl titanates are used then preparative problems occur due to the high reactivity of alkyl titanates. In addition, materials with unsatisfactory storage stability are obtained. Colorless titanium citrate complexes (EP-A 310 986, U.S. Pat. No. 4,931,094) are also known, but if used in one-component materials, they yield products with inadequate storage stability and poor cross-linking characteristics. According to the prior art, therefore, chelate complexes of titanium with 1,3-diketones such as acetylacetone or with esters of acetoacetic acid are used as an organic titanium compound for one-component RTV materials (e.g. diisobutyl-di(ethylacetoacetate)titanate). These chelate complexes, however, frequently cause discoloration problems, which are ascribed to the complexing agent.

Therefore there is the problem of finding novel titanium complexes which do not cause discoloration in cross-linked one-component RTV materials and also possess good characteristics during cross-linking and storage of one-component RTV materials.

It was found that the known disadvantages of 1K-RTV materials which contain organic titanium compounds can be avoided to the greatest possible extent if the compounds which are used as organic titanium compounds are those which are obtained by reacting titanates with β-dicarbonyl compounds and citrates. Unexpectedly, it was observed that those titanates which contained a combination of alkoxy and/or 1,n-dioxyorgano groups and the abovementioned chelating agents, used as a catalyst in one-component RTV materials, produced colorless and storage stable polysiloxane materials which could be quickly and easily fully cured.

The object of the present invention is accordingly novel titanium(IV) chelates and polysiloxane materials which can be hardened at ambient temperature under the influence of water or moisture, which are obtainable by mixing a) polyorganosiloxanes with reactive terminal groups,
b) polyorganosiloxanes with non-reactive terminal groups,
c) silane cross-linkers,
d) reaction products of titanates with β-dicarbonyl compounds and citrates,
e) fillers and
f) other additives and auxiliary substances such as e.g. adhesives, stabilizers, etc.

Polydiorganosiloxanes with reactive terminal groups which may be used are polydimethylsiloxanes, wherein some of the methyl groups may be optionally replaced with vinyl, phenyl, $C_2$ to $C_8$-alkyl or haloalkyl groups.

The polydimethylsiloxanes should in principle be linear, although small proportions of branch-effective organosiloxy units may be present. The viscosity of the polymers is preferably between 5 and 1,000 Pa.s, preferably below 100 Pa.s. Possible reactive terminal groups are OH groups or trialkoxysilyl or dialkoxyalkylsilyl groups. In the last case, diethoxymethylsilyl, diethoxyvinylsilyl or dimethoxymethylsilyl groups are preferred.

Suitable silane cross-linkers are alkoxysilanes, oximosilanes or carbonamidosilanes. Preferred alkoxysilanes are tetraethoxysilane, methyltrimethoxysilane, triethethoxysilane or vinyltriethoxysilane.

Preferred oximosilanes are those which contain 3 or 4 oxime groups bonded via oxygen, or their mixtures. Particularly preferred are oximosilanes with the following structure:

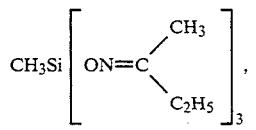

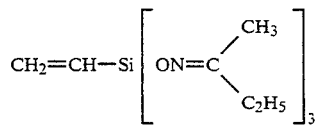

or

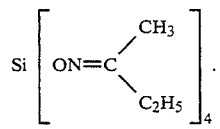

Preferred carbonamidosilanes are those with the following structure:

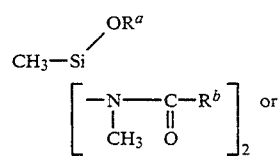

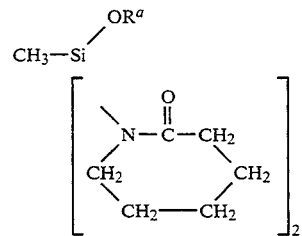

wherein $R^a$ represents methyl or ethyl and
$R^b$ represents methyl, ethyl or phenyl.

Titanates which are suitable for reacting with β-dicarbonyl compounds and citrates are compounds of the formula

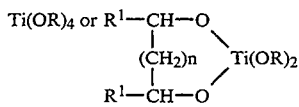

wherein
R represents identical or different linear or branched $C_1$ to $C_{20}$-alkyl groups or alkoxyalkyl groups, which optionally have one or more OH groups on one or more carbon atoms at any position,
$R^1$ corresponds to an R group or hydrogen or is a C(O)OR group, and
n is 0 or 1.

The alkyl groups may be identical or different. Preferred alkyl groups are ethyl, i-propyl, n-butyl, i-butyl and 2-ethylhexyl groups.

Examples are:

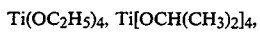

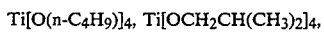

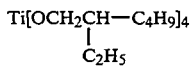

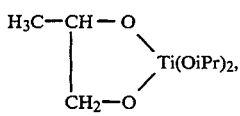

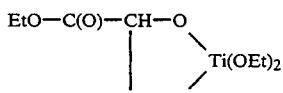

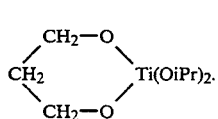

Cyclic titanates might optionally be prepared beforehand from the corresponding dihydroxy compound and an alkyl titanate and be reacted in a subsequent step with the corresponding β-dicarbonyl compounds and citrates.

Corresponding dihydroxy compounds might be e.g., 1,2- or 1,3-propanediol, 2,3-butanediol, 1,4-octanediol or diethyl tartrate.

Furthermore, suitable titanates might be prepared by reacting polyalcohols such as glycerine with alkyl titanates, wherein it is not necessary for all the hydroxyl groups to react to give covalent Ti—O bonds.

The β-dicarbonyl compounds used are preferably 2,4-pentandione and acetoacetates such as e.g. ethyl acetoacetate, isobutyl acetoacetate, and the like.

Preferred citrates are triisobutyl citrate, diethyl citrate, triethyl citrate, and the like. However, mixed trialkyl esters such as, e.g., diisobutylethyl citrate, may also be used.

Esters of acetoacetic acid and citric acid with long-chain alkyl groups may either be reacted directly with the titanates or, advantageously, be produced from readily available and inexpensive ethyl esters by transesterification with the corresponding alcohols, during or after synthesis of the titanium chelates.

Reaction of the titanates with the β-dicarbonyl compounds and citrates takes place spontaneously after mixing the reaction partners or optionally after heating the reaction mixture. The alcohols which are released may be removed after completion of the reaction by distillation at atmospheric pressure or under vacuum or may remain partly or completely in the mixture.

In the reaction, 0.1 to 2.1 moles of β-dicarbonyl compounds and 0.1 to 2.1 moles of citrates are preferably used per mole of titanate, wherein the sum of the moles of β-dicarbonyl compounds and citrates should be between 1 and 3, particularly preferably between 1.5 and 2 moles. Particularly preferably, 0.1 to 1.9, in particular 0.1 to 1.5,
moles of citrate are used per mole of titanate.

It is assumed that the reaction products or mixtures thereof have the following structure:

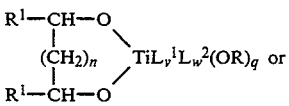

oligomeric structures such as

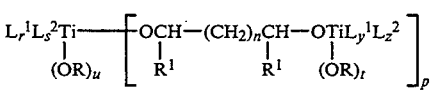

wherein $x + y + z = 4$,
$v + w + q = 2$,
$r + s + u + p = 4$,
$y + z + t = 3$,
$n = 0$ or $1$, y, z, v, w has a value, on average, of 0.1 to 2.1, preferably 0.1 to 1.9, particularly preferably 0.5 to 1.5,
r, s has a value of 0 to 2.1,
x has a value, on average, of 1.0 to 3.0,
q has a value, on average, of 0 to 0.9,
u, t has a value, on average, of 0 to 2.0,
p has a value, on average, of 1 to 4,
$L^1$ is a ligand of the structure

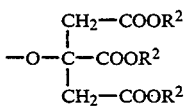

$L^2$ is a ligand of the structure

R and $R^1$ have the same meaning as given above, in the description of the titanates, and each may be identical or different,
$R^2$ represents identical or different linear or branched $C_1$ to $C_{20}$-alkyl or alkoxyalkyl groups, which optionally have one or more OH groups on one or more carbon atoms in any position, or hydrogen, and $R^3$ represents identical or different linear or branched $C_1-C_{20}$-alkyl or alkoxyalkyl groups.

The titanium compounds obtained as reaction products are used in amounts of 0.05 to 10% by weight, preferably 0.2 to 6% by weight, with reference to the amount of polyorganosiloxane (component a).

The titanium chelates according to the invention may optionally be converted into oligomers which have Ti—O—Ti bridges as structural elements, by partial hydrolysis.

Furthermore, at least one filler is used which confers stability on the pastes and strength to the vulcanized product. Suitable fillers are pyrogenic silicic acid and/or finely divided chalk as well as optionally other normal fillers. Furthermore, auxiliary agents and additives which may be used are adhesion promoters, such as aminoalkylsilanes, epoxysilanes or mercaptosilanes, catalysts, e.g. dialkyltin dicarboxylate or zinc octoate, stabilizers and optionally other reactive silanes such as for example hexamethyldisilazane.

Preparation of the 1K-RTV materials according to the invention takes place in the usual way by mixing the components with the exclusion of moisture.

EXAMPLES

Example 1

150.0 g (0.53 mol) of tetraisopropyl titanate were initially placed in a round-bottomed flask with a stirrer, dropping funnel, thermometer and distillation apparatus (distillation attachment, condenser and receiver) and 145.8 g (0.53 mol) of triethyl citrate were added slowly with stirring over the course of half an hour. Then 69.0 g (0.53 mol) of ethyl acetoacetate were added.

After completion of the addition, stirring was continued at RT for 1 hour and then the alcohol released during reaction was distilled off. 304.8 g of a clear, pale yellow liquid were obtained.

Elemental analysis ($C_{24}H_{42}O_{12}Ti$) Found: 50.6% C, 7.4% H, 8.4% Ti Calculated: 50.5% C, 7.4% H, 8.4% Ti $^1$H NMR (300 MHz, CDCl$_3$, ppm) δ1.25 (mult CH$_3$, Int=135), 1.95 (s, C—CH=C, Int=15.0), 2.7–3.05 (mult CH$_2$, Int=20.00, 4.0–4.5 (mult OCH$_2$, Int=33.0), 4.6–3.3 (mult OCH$_2$, Int=20.0).

Example 2

The same procedure was used as in Example 1 and 209.0 g (0.61 mol) of tetraisobutyl titanate were reacted with 169.8 g (0.61 mol) of triethyl citrate and 80.0 g (0.61 mol) of ethyl acetoacetate. A pale yellow liquid (399.9 g) was isolated as product.

Example 3

61.0 g of the titanate obtained as in Example 2 was boiled under reflux for 4 hours in 55.0 g of isobutanol and then the alcohol was removed by distillation. 63.5 g of a pale yellow viscous liquid were isolated.

Example 4

In the same way as in Example 1 114.1 g, (0.5 mol) of tetraethyl titanate were reacted with 103.1 g (0.5 mol) of diethyl tartrate, 65.0 g, (0.5 mol) of ethyl acetoacetate and 138.1 g (0.5 mol) of triethyl citrate. After distilling off the alcohol, a yellow clear liquid was obtained with the yield being 335.8 g.

Elemental analysis: ($C_{26}H_{40}O_{16}Ti$) Found: 47.8% C, 6.3% H, 6.9% Ti Calculated: 47.6% C, 6.1% H, 7.3% Ti

Example 5

142.1 g (0.5 mol) of tetraisobutyl titanate were reacted with 38.0 g (0.5 mol) of 1,2-propandiol, 117.0 g (0.9 mol) of ethyl acetoacetate and 27.6 g (0.1 mol) of triethyl citrate. 223.8 g of a yellow clear liquid were isolated.

Example 6 (Comparison without a citrate)

90.6 g (0.27 mol) of tetraisobutyl titanate were reacted with 69.4 g (0.53 mol) of ethyl acetoacetate. After removing the alcohol, 121.2 g of a dark red clear liquid were isolated, which could be characterized as diisobutoxy-di(ethylacetoacetate)titanate, using NMR spectroscopy.

Example 7 (Comparison without ethyl acetoacetate)

In the same way as in Example 1, 60 g (0.21 mol) of tetraisopropyl titanate were reacted with 116.6 g (0.42 mol) of triethyl citrate. The mixture was freed of alcohol under vacuum and 154.6 g of a clear, pale yellow liquid was obtained.

Elemental analysis: ($C_{30}H_{52}O_{16}Ti$): Found: 49.4% C, 7.3% H, 6.7% Ti Calculated: 50.3% C, 6.7% H, 6.7% Ti $^1$HNMR (300 MHz, CDCl$_3$, ppm): δ1.25 (mult CH$_3$, Int=150), 2.7–3.05 (mult CH$_2$, Int=37), 4.05–4.40 (mult OCHC$_2$, Int=47), 4.6–5.3 (mult, OCHC$_2$, Int=13.4).

Example 8 (Comparison without a citrate)

In the same way as in Example 1, 111.3 g (0.49 mol) of tetraethyl titanate were reacted with 100.6 g (0.49 mol) of diethyl tartrate and then with 125.9 g (0.98 mol) of ethyl acetoacetate. After removing the alcohol under reduced pressure, 254.8 g of a red clear liquid were obtained.

Example 9

55.0 parts by weight of a polydimethylsiloxane with —OSi(OCH$_3$)$_2$(CH$_3$) terminal groups, which had a viscosity of 50 Pas, were mixed in a planetary mixer with 29.0 parts by weight of a polydimethylsiloxane with —OSi(CH$_3$)$_3$ terminal groups (viscosity 0.1 Pas) and 2.5 parts by weight of methyltrimethoxysilane. Then 9.5 parts by weight of fumed silica were admixed. Finally, the titanium chelates according to Examples 1 to 8 were added, with the parts by weight being listed in Table 1.

To assess the cross-linking characteristics and the adhesion, a 4 mm thick test sheet was applied to a glass plate over an area of 40 by 60 mm. After 48 hours the material was fully cured through to the glass surface and could no longer be pulled away from the substrate without producing cohesive cracks.

To test the mechanical data, 2 mm sheets were prepared and, after 6 days curing at 23° C. and 50% relative humidity, were tested in accordance with DIN 53 504.

The storage stability was assessed by storing the paste in a sealed robe at 50° C. Samples were withdrawn at 1 week intervals and tested for cross-linking. After exceeding the storage time given in Table 1, the materials did not cross link any more after 1 week.

TABLE 1

Test results for sealing compounds prepared in accordance with Example 10

| Titanate example | Parts | Cross-linking | Sealant Color | Storage stability | Hardness Shore A | Breaking extension [%] | E. Modulus [N/mm$^2$] | Resistance to tearing [N/mm$^2$] |
|---|---|---|---|---|---|---|---|---|
| 1. | 1 | 2 | 1 | 28 | 20 | 573 | 0.42 | 1.95 |
| 2. | 1 | 2 | 1 | 21 | 19 | 562 | 0.39 | 1.84 |
| 3. | 1 | 2 | 1 | 42 | 19 | 601 | 0.46 | 2.17 |
| 4. | 1 | 3 | 1 | — | 22 | 372 | 0.51 | 1.57 |
| 5. | 1 | 3 | 1 | 42 | 20 | 574 | 0.45 | 2.10 |
| 6. | 1 | 0 | 2 | 56 | 20 | 627 | 0.39 | 1.87 |
| 7. | 2 | 3 | 1 | 14 | — | — | — | — |
| 8. | 1 | 0 | 2 | — | 20 | 425 | 0.45 | 1.87 |

Explanations:
Cross-linking: Assessed by full curing of a 4 mm thick sheet on a glass plate for 2 days; 0 = well cross-linked, dry surface, 1 = surface slightly sticky, 2 = surface sticky, 3 = surface very sticky
Color: Assessed on cured sealants; 1 = colorless, 2 = yellow
Storage stability: at 50° C., in days.

Example 10

46.6 parts by weight of a polydimethylsiloxane with —OSi(CH$_3$)$_2$OH terminal groups, which had a viscosity of 50 Pas, were mixed in a planetary mixer with 19.6 parts by weight of a polydimethylsiloxane with —OSi(CH$_3$)$_3$ terminal groups (viscosity 0.1 Pas) and 20 parts by weight of chalk treated with stearic acid. Afterwards, 3.5 parts by weight of a titanium complex, prepared according to Example 3, were admixed. The batch was completed by the addition of 4.5 parts by weight of a hydrophilic fumed silica 0.7 parts by weight of dibutyltin dilaurate and 3.0 parts by weight of a silane of the formula CH$_3$Si(OC$_2$H$_5$)[N(CH$_3$)COC$_6$H$_5$]$_2$.

The paste was drawn out as a test sheet and after 24 hours it was fully cured and was not discolored. The unvulcanized paste was storage stable for longer than 42 days (test conditions in Example 9).

Example 11

32.5 pans by weight of a polydimethylsiloxane with —OSi(CH$_3$)$_2$OH terminal groups, which had a viscosity of 80 Pas, was mixed in a planetary mixer with 22.0 parts by weight of a polydimethylsiloxane with —OSi(CH$_3$)$_3$ terminal groups (viscosity 0.01 Pas) and 32.5 parts by weight of chalk treated with stearic acid. Afterwards, 2.0 parts by weight of the titanium complex according to Example 2 was admixed. The batch was completed by admixing 2.5 parts by weight of methyltrimethoxysilane and 5.5 parts by weight of a hydrophilic fumed silica.

The test on cross-linking and glass adhesion demonstrated good adhesion and no color change after 48 hours.

It will be appreciated that the instant specification and claims are set forth by way of illustration and not limitation, and that various modifications and changes may be made without departing from the spirit and scope of the present invention.

What is claimed is:

1. A one-component RTV material comprising a mixture of:
   a) polyorganosiloxanes having reactive terminal groups,
   b) polyorganosiloxanes having nonreactive terminal groups,
   c) silane crosslinkers,
   d) reaction products of titanates with β-dicarbonyl compounds and citrates,
   e) fillers, and optionally
   f) other additives.

2. A one-component RTV material according to claim 1, wherein the titanates are of the formula

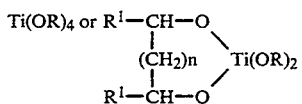

wherein
represents identical or different linear or branched C$_1$ to C$_{20}$-alkyl groups or alkoxyalkyl groups, which optionally have one or more OH groups on one or more carbon atoms at any position;
R$^1$ corresponds to an R group or hydrogen or is a C(O)OR group; and
n is 0 or 1.

3. The one-component RTV material of claim 1, wherein said reaction product of said titanite with said β-dicarbonyl compound and said citrate is present in an amount of from about 0.1 to 10% by weight of said polyorganosiloxane having a reactive terminal group.

* * * * *